US010711337B2

(12) United States Patent
Zeien

(10) Patent No.: US 10,711,337 B2
(45) Date of Patent: *Jul. 14, 2020

(54) SYSTEM AND METHOD FOR STAINLESS STEEL CLADDING OF CARBON STEEL PIECES

(71) Applicant: Commercial Metals Company, Irving, TX (US)

(72) Inventor: Timothy P. Zeien, Little Mountain, SC (US)

(73) Assignee: COMMERCIAL METALS COMPANY, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,907

(22) Filed: Oct. 16, 2018

(65) Prior Publication Data

US 2019/0048453 A1 Feb. 14, 2019

Related U.S. Application Data

(63) Continuation of application No. 14/621,525, filed on Feb. 13, 2015, now Pat. No. 10,106,877, which is a (Continued)

(51) Int. Cl.
*B32B 15/00* (2006.01)
*C23C 4/02* (2006.01)
(Continued)

(52) U.S. Cl.
CPC .............. *C23C 4/02* (2013.01); *B21C 99/00* (2013.01); *B24C 9/006* (2013.01); *B32B 15/011* (2013.01); *C22C 38/00* (2013.01); *C22C 38/18* (2013.01); *C23C 4/08* (2013.01); *C23C 4/123* (2016.01); *C23C 4/131* (2016.01); *C23C 4/134* (2016.01);
(Continued)

(58) Field of Classification Search
None
See application file for complete search history.

(56) References Cited

U.S. PATENT DOCUMENTS 2,618,846 A 11/1952 Morris et al.
3,188,776 A * 6/1965 Dill .................... B21B 45/04
451/39

(Continued)

OTHER PUBLICATIONS

RR De Rojas, New Developments in Steel Reinforcement Protection From Corrosion, Jun. 2001, Massachusetts Institutes of Technology, Master's Thesis for the Department of Civil and Environmental Engineering. (Year: 2001).*

(Continued)

*Primary Examiner* — Seth Dumbris
*Assistant Examiner* — Kim S. Horger
(74) *Attorney, Agent, or Firm* — Haynes and Boone, LLP

(57) ABSTRACT

A system and method of cladding a carbon steel piece with stainless steel according to which the carbon steel piece is cleaned, heated, coated with the stainless steel, and strengthened. In an exemplary embodiment, coating the carbon steel piece with the stainless steel includes melting the stainless steel, atomizing the melted stainless steel, and spraying the atomized stainless steel so that at least a portion of the atomized stainless steel is deposited on the carbon steel piece to thereby coat the carbon steel piece with the stainless steel.

8 Claims, 5 Drawing Sheets

Related U.S. Application Data continuation of application No. 13/798,510, filed on Mar. 13, 2013, now Pat. No. 8,978,430.

(51) Int. Cl.

| | | |
|---|---|---|
| *C23C 4/18* | (2006.01) | |
| *C23C 4/08* | (2016.01) | |
| *C23C 4/131* | (2016.01) | |
| *C23C 4/123* | (2016.01) | |
| *C23C 4/134* | (2016.01) | |
| *B21C 99/00* | (2009.01) | |
| *B24C 9/00* | (2006.01) | |
| *B32B 15/01* | (2006.01) | |
| *C22C 38/00* | (2006.01) | |
| *C22C 38/18* | (2006.01) | |

(52) U.S. Cl.
CPC ............... *C23C 4/18* (2013.01); *Y02P 70/179* (2015.11); *Y10T 428/12965* (2015.01)

(56) References Cited

U.S. PATENT DOCUMENTS

| | | | |
|---|---|---|---|
| 4,086,104 A * | 4/1978 | Kinoshita | C21D 7/04 |
| | | | 148/325 |
| 4,302,483 A * | 11/1981 | Altorfer | C23C 4/123 |
| | | | 219/76.14 |
| 5,462,769 A | 10/1995 | Tsai | |
| 5,614,022 A | 3/1997 | Vatavuk | |
| 5,676,775 A | 10/1997 | Cacace | |
| 5,753,313 A | 5/1998 | Tsai | |
| 5,908,670 A | 6/1999 | Dunkerley et al. | |
| 6,269,669 B1 | 8/2001 | Matsubara et al. | |
| 6,273,968 B1 | 8/2001 | Thomas | |
| 6,646,427 B2 | 11/2003 | Trejo et al. | |
| 6,706,416 B1 | 3/2004 | Cacace | |
| 6,709,534 B2 | 3/2004 | Kusinski et al. | |
| 6,746,548 B2 | 6/2004 | Kusinski et al. | |
| 6,793,093 B2 | 9/2004 | Tsai | |
| 7,105,205 B2 * | 9/2006 | Clayton | B23K 3/0607 |
| | | | 427/446 |
| 7,214,278 B2 | 5/2007 | Kusinski et al. | |
| 7,838,082 B2 | 11/2010 | Nesbitt | |
| 8,978,430 B2 | 3/2015 | Zeien | |
| 2004/0112513 A1 | 6/2004 | Cacace | |
| 2004/0149362 A1 | 8/2004 | Kusinski et al. | |

OTHER PUBLICATIONS

MF Hurley and JR Scully, Threshold Chloride Concentrations of Selected Corrosion-Resistance Rebar Materials Compared to Carbon Steel, Oct. 2006, Corrosion Science Section, vol. 62, No. 10, p. 892-904. (Year: 2006).*

Electric Arc Spray—ASB Industries, Inc., available at http://www.asbindustries.com/electric-arc-spray (1 page) retrieved Feb. 26, 2013.

Office Action dated Sep. 2, 2014 in U.S. Appl. No. 13/798,510, USPTO, 5 pages.

Notice of Allowance dated Nov. 13, 2014 in U.S. Appl. No. 13/798,510, USPTO, 5 pages.

Office Action dated Feb. 7, 2018 in U.S. Appl. No. 14/621,525, USPTO, 5 pages.

Notice of Allowance dated Jun. 11, 2018 in U.S. Appl. No. 14/621,525, USPTO, 5 pages.

\* cited by examiner

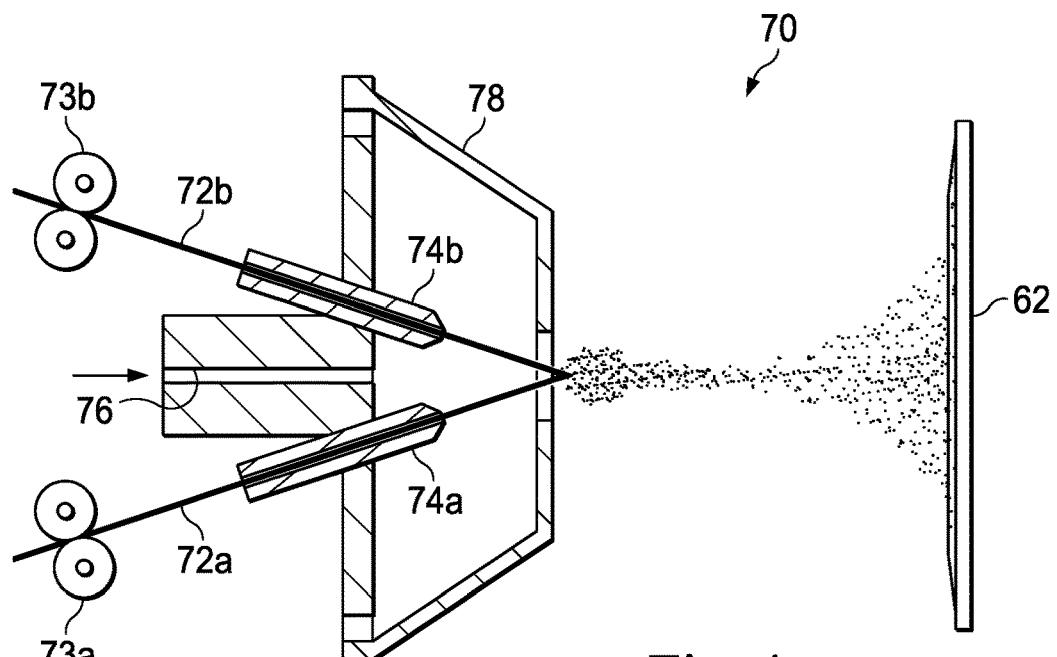
Fig. 4
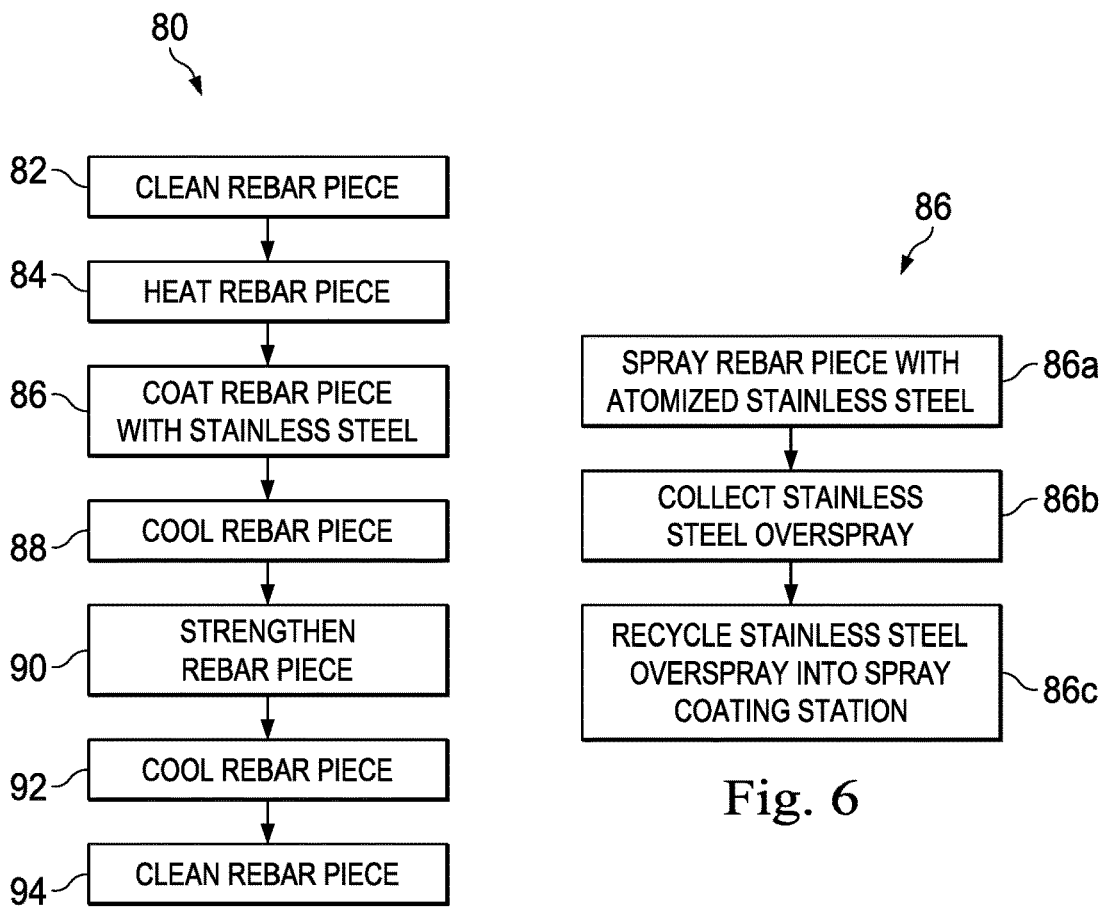
Fig. 5
Fig. 6

SYSTEM AND METHOD FOR STAINLESS STEEL CLADDING OF CARBON STEEL PIECES

CROSS-REFERENCE TO RELATED APPLICATIONS

This application is a continuation of U.S. patent application Ser. No. 14/621,525, filed Feb. 13, 2015, which is a continuation of U.S. patent application Ser. No. 13/798,510, filed Mar. 13, 2013, now U.S. Pat. No. 8,978,430, the entire disclosures of which are hereby incorporated herein by reference.

BACKGROUND

The present disclosure relates in general to the cladding of steel and steel-related products, and in particular to a system and method for the stainless steel cladding of carbon steel pieces such as, for example, carbon steel reinforced bar ("rebar") pieces.

Cladding is the process of covering one material with another. For metalworking, a cladding process can be used to cover carbon steel pieces, such as carbon steel rebar pieces, with stainless steel. Typical benefits that may result from such cladding processes include increased corrosion resistance and strength of the carbon steel pieces. However, some cladding processes may result in pinhole bleeds of corrosion in the carbon steel pieces, may require post rolling processes, and/or may not result in sufficient bending and corrosion resistance properties of the carbon steel pieces. Therefore, what is needed is a system or method that addresses one or more of these issues, among others.

BRIEF DESCRIPTION OF THE DRAWINGS

FIG. 4 is a diagrammatic illustration of a portion of the spray coating station of FIG. 3, according to an exemplary embodiment.

FIG. 5 is a flow chart illustration of a method of operating the system of FIG. 1, according to an exemplary embodiment.

FIG. 6 is a flow chart illustration of a step of the method of FIG. 5, according to an exemplary embodiment.

DETAILED DESCRIPTION

Figure 1:
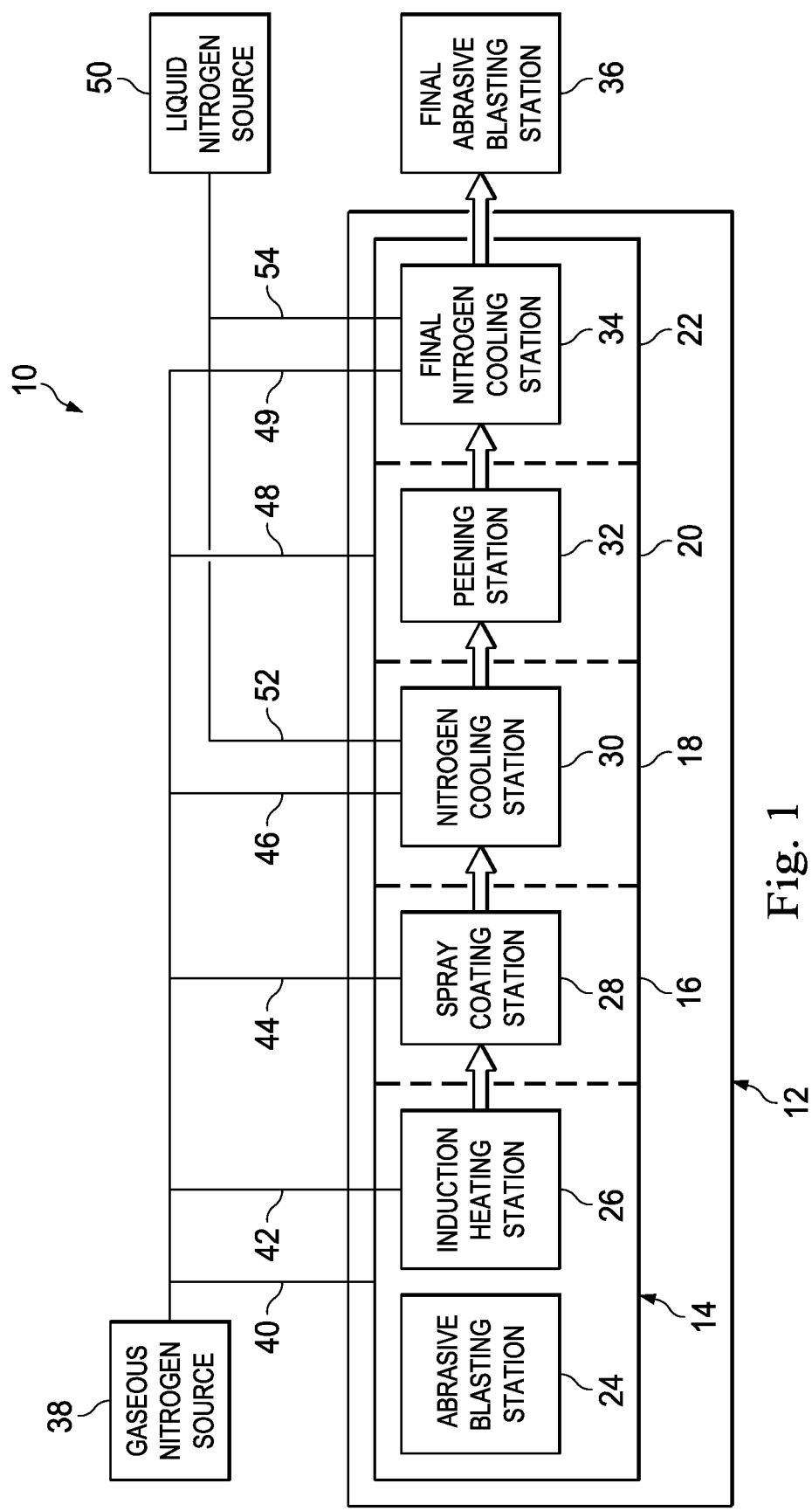
FIG. 1 is a diagrammatic illustration of a system according to an exemplary embodiment, the system including an induction heating station and a spray coating station.

In an exemplary embodiment, as illustrated in FIG. 1, a system is generally referred to by the reference numeral 10 and includes an inert atmosphere chamber 12 including five individual chambers 14, 16, 18, 20 and 22 respectively therein. An abrasive blasting station 24 and an induction heating station 26 are disposed within the individual chamber 14. A spray coating station 28 is disposed within the individual chamber 16. A nitrogen cooling station 30 is disposed within the individual chamber 18. A cold work peening station 32 is disposed within the individual chamber 20. A final nitrogen cooling station 34 is disposed within the individual chamber 22. The system 10 further includes a final abrasive blasting station 36, which is located outside of the inert atmosphere chamber 12. A gaseous nitrogen source 38 is in fluid communication with the individual chamber 14 via line 40, the induction heating station 26 via line 42, the spray coating station 28 via line 44, the nitrogen cooling station 30 via line 46, the cold work peening station 32 via line 48, and the final nitrogen cooling station 34 via line 49. Additionally, the chambers 14, 16, 18, 20, and 22 are in fluid communication with each other. A liquid nitrogen source 50 is in fluid communication with the nitrogen cooling station 30 via line 52, and the final nitrogen cooling station 34 via line 54.

Figure 2:
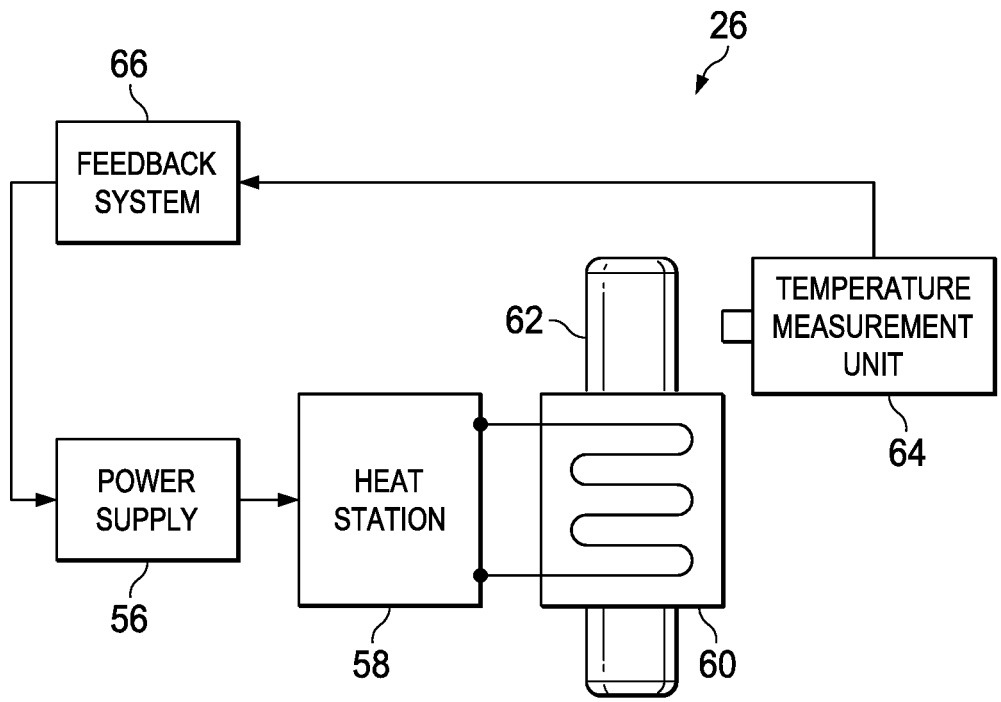
FIG. 2 is a diagrammatic illustration of the induction heating station of the system of FIG. 1, according to an exemplary embodiment.

In an exemplary embodiment, as illustrated in FIG. 2 with continuing reference to FIG. 1, the induction heating station 26 includes a power supply 56 and a heat station 58 electrically coupled thereto. In certain exemplary embodiments, the power supply 56 is an AC power supply. In an exemplary embodiment, the power supply 56 is a solid state RG power supply. The heat station 58 is electrically coupled to an induction heating coil 60. The induction heating coil 60 is adapted to be operably coupled with a carbon steel piece, such as a carbon steel rebar piece 62, under conditions to be described below. A temperature measurement unit 64 is adapted to be operably positioned proximate the rebar piece 62 so as to measure the surface temperature of the rebar piece 62 as it is heated by, and exits from, the induction heating coil 60, under conditions to be described below. In an exemplary embodiment, the temperature measurement unit 64 is, or includes, an infrared camera. In certain exemplary embodiments, the temperature measurement unit 64 is operably coupled to a feedback system 66. The feedback system 66 is operably coupled to the power supply 56. The feedback system 66 is adapted to control the operation of the power supply 56 and thus the induction heating coil 60.

Figure 3:
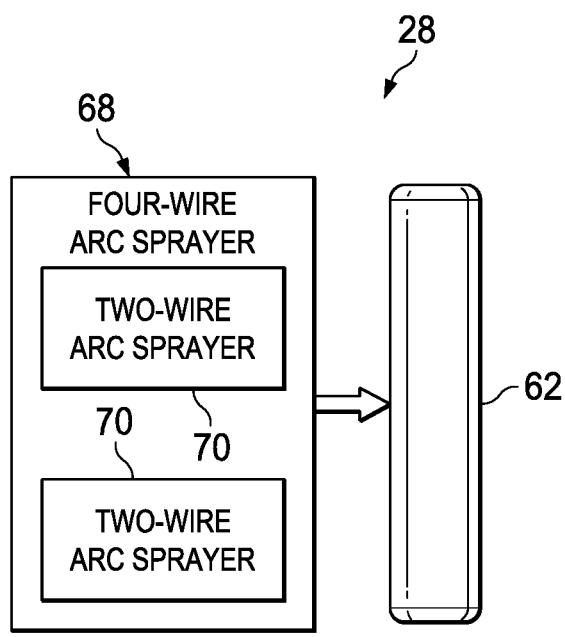
FIG. 3 is a diagrammatic illustration of the spray coating station of the system of FIG. 1, according to an exemplary embodiment.

In an exemplary embodiment, as illustrated in FIG. 3 with continuing reference to FIG. 1, the spray coating station 28 includes a four-wire arc sprayer 68. In certain exemplary embodiments, the four-wire arc sprayer 68 includes two individual two-wire arc sprayers 70 operably positioned adjacent one another. Under conditions to be described below, the four-wire arc sprayer 68 coats the rebar piece 62 with a stainless steel coating.

In an exemplary embodiment, as illustrated in FIG. 4 with continuing reference to FIGS. 1 and 3, each of the two-wire arc sprayers 70 includes stainless steel metal wires 72a and 72b, each of which is operably positioned such that the tips of the stainless steel metal wires 72a and 72b meet inside a contact housing or chamber 78. The stainless steel metal wires 72a and 72b are adapted to be guided into the contact chamber 78 by pairs of rollers 73a and 73b, respectively. Contact tubes 74a and 74b are operably coupled to the contact chamber 78. The stainless steel metal wires 72a and 72b are adapted to pass through the contact tubes 74a and 74b, respectively, before meeting in the contact chamber 78. An atomizing passage 76 is further operably coupled to the contact chamber 78, between the contact tubes 74a and 74b. Under conditions to be described below, an inert gas passes through the atomizing passage 76 and contacts the stainless steel metal wires 72a and 72b inside the contact chamber 78, creating an atomized spray stream of metal to coat the rebar piece 62.

In an exemplary embodiment, as illustrated in FIG. 5 with continuing reference to FIGS. 1, 2, 3, and 4, a method of operating the system 10 is generally referred to by the reference numeral 80. In several exemplary embodiments, the method 80 is carried out to coat the rebar piece 62. In certain exemplary embodiments, the method 80 is carried out to coat the rebar piece 62 with stainless steel.

The method 80 includes a step 82, at which the rebar piece 62 is cleaned. In an exemplary embodiment, the rebar piece 62 is cleaned by passing it through the abrasive blasting station 24. In the abrasive blasting station 24, the rebar piece 62 is cleaned in order to remove any contaminants on the surface. In certain exemplary embodiments, the abrasive blasting station 24 includes a grit or shot blaster, with which the rebar piece 62 is cleaned and the surface thereof is conditioned at the step 82. In other embodiments, the rebar piece 62 is cleaned via shot peening, which cleans and conditions the surface of the rebar piece 62.

The method 80 further includes a step 84, at which the rebar piece 62 is heated. In an exemplary embodiment, after passing through the abrasive blasting station 24 at the step 82, the rebar piece 62 is passed through the induction heating station 26 at the step 84. In the induction heating station 26, the rebar piece 62 is passed through the induction coil 60. The power supply 56 supplies electrical power to the induction coil 60. In certain embodiments, the power supply 56 supplies AC electrical power to the induction coil 60. As the rebar piece 62 passes through the induction coil 60, the rebar piece 62 is induction heated to a preferred surface temperature. In certain exemplary embodiments, the surface temperature of the rebar piece 62 is between about 1800 and about 2500 degrees Fahrenheit. The temperature measurement unit 64 monitors the surface temperature of the rebar piece 62. As noted above, the temperature measure unit 64 is operably coupled to the feedback system 66, which in turn is operably coupled to the power supply 56. In several exemplary embodiments, when the rebar piece 62 reaches the preferred surface temperature, the feedback system 66 turns off the power supply 56 and/or causes the rebar piece 62 to move out of the induction heating station 26 and into the spray coating station 28.

In an exemplary embodiment, as illustrated in FIGS. 5 and 6 with continuing reference to FIGS. 1, 2, 3 and 4, the method 80 further includes a step 86, at which the rebar piece 62 is coated with stainless steel.

As shown in FIG. 6, the step 86 includes spraying the rebar piece 62 with atomized stainless steel at step 86a. Before, during and/or after the step 86a, stainless steel overspray from the spraying of the atomized stainless steel at the step 86a is collected at step 86b. Before, during and/or after the step 86b, the stainless steel overspray is recycled back into the spray coating station 28 at step 86c.

In an exemplary embodiment, to spray the rebar piece 62 with atomized stainless steel at the step 86a, the rebar piece 62 is passed through the spray coating station 28. Within the spray coating station 28, the rebar piece 62 is coated with stainless steel by the four-wire arc sprayer 68. More particularly, the pairs of rollers 73a and 73b guide the stainless steel metal wires 72a and 72b, respectively, into the contact chamber 78 so that the respective tips of the stainless steel metal wires 72a and 72b meet inside the contact chamber 78. As the stainless steel metal wires 72a and 72b are so guided, the stainless steel metal wires 72a and 72b pass through the contact tuber 74a and 74b, respectively. As the stainless steel metal wires 72a and 72b enter the contact chamber 78, the wires are melted. In certain exemplary embodiments, the stainless steel metal wires 72a and 72b are melted using an electric arc.

In an exemplary embodiment, at the step 86a, an inert gas such as, for example, nitrogen or argon, passes through the atomizing passage 76 and contacts the melted or molten stainless steel metal wires 72a and 72b inside the contact chamber 78, creating an atomized spray stream of metal to coat the rebar piece 62, which is positioned proximate the contact chamber 78. In an exemplary embodiment, at the step 86a, compressed nitrogen flows from the gaseous nitrogen source 38 and through the line 44 and the atomizing passage 76, and then contacts the melted or molten stainless steel wires 72a and 72b, thereby atomizing the stainless steel. The atomized stainless steel is sprayed or otherwise propelled towards the surface of the rebar piece 62. In an exemplary embodiment, the atomized stainless steel is deposited on the rebar piece 62 in a semi-molten condition to form an impermeable stainless steel coating on the rebar piece 62. In certain exemplary embodiments, the atomized stainless steel rapidly solidifies to form a stainless steel coating on the rebar piece 62. In an exemplary embodiment, about a 0.007-inch thick impermeable stainless steel coating is formed on the rebar piece 62. In an exemplary embodiment, the thickness of the stainless steel coating is less than 0.007 inches. In another exemplary embodiment, the thickness of the stainless steel coating is equal to or greater than 0.007 inches. In other exemplary embodiments, the thickness of the stainless steel coating ranges from about 0.007 inches to about 0.010 inches. In still other exemplary embodiments, the thickness of the stainless steel coating is greater than 0.010 inches.

In several exemplary embodiments, during the step 86a, the rebar piece 62 is rotated so that a relatively even stainless steel coating is formed on the rebar piece 62. In several exemplary embodiments, during the step 86a, relative movement is effected between the rebar piece 62 and the four-wire arc sprayer 68 or component(s) thereof, in order to evenly distribute the atomized stainless steel on the rebar piece 62. In other exemplary embodiments, the rebar piece 62 is not rotated as it is coated.

In an exemplary embodiment, as noted above, the step 86 further includes a step 86b, at which stainless steel overspray is collected during, and/or after, the coating of the rebar piece 62 with stainless steel at the step 86a. The stainless steel overspray is that portion of the atomized stainless steel that was spraying during the step 86a, but was not deposited on the rebar piece 62. In several exemplary embodiments, the stainless steel overspray collected at the step 86b as a result of the execution of the step 86a may be sold on the market. In several exemplary embodiments, the stainless steel overspray collected at the step 86b as a result of the execution of the step 86a may initially be in powder form, and then the metal powder may be formed into bricks or pucks and sold on the market.

In an exemplary embodiment, as noted above, the step 86 further includes a step 86c, at which the stainless steel overspray is recycled. The step 86c will be described in further detail below. In an exemplary embodiment, the step 86c may be omitted from the step 86. In an exemplary embodiment, the steps 86b and 86c may be omitted form the step 86.

Referring back to FIG. 5 with continuing reference to FIGS. 1, 2, 3 and 4, the method 80 further includes a step 88, at which the rebar piece 62 is cooled. In exemplary embodiments, the step 88 is executed by passing the rebar piece 62 through the nitrogen cooling station 30. An atomized stream of liquid nitrogen is pumped into the nitrogen cooling station 30 via the line 52, thereby cooling the rebar piece 62 disposed within the nitrogen cooling station 30. In certain exemplary embodiments, the rebar piece 62 is cooled to a surface temperature of between about 1100 and about 1400 degrees Fahrenheit. In certain embodiments, an infrared camera (not shown) measures the surface temperature of the rebar piece to ensure that the rebar piece 62 is adequately cooled.

As shown in FIG. 5, the method 80 further includes a step 90, at which the rebar piece 62 is strengthened. In an exemplary embodiment, the rebar piece 62 is strengthened by passing the rebar piece 62 through the shot peening station 32. At the shot peening station 32, the rebar piece 62 is impacted with shot in a cold working process in order to clean and smooth the rebar piece 62.

The method 80 further includes a step 92, at which the rebar piece 62 is cooled. In an exemplary embodiment, the rebar piece 62 is cooled by passing the rebar piece through the final nitrogen cooling station 34. An atomized stream of liquid nitrogen is pumped into the final nitrogen cooling station 34 via the line 54. In certain exemplary embodiments, the rebar piece 62 is cooled to a surface temperature of below about 400 degrees Fahrenheit before exiting the final nitrogen cooling chamber 34.

In several exemplary embodiments, the steps 82, 84, 86, 88, 90 and 92 of the method 80 all take place inside an inert atmosphere within the inert atmosphere chamber 12. In certain exemplary embodiments, an inert nitrogen atmosphere is provided in the inert atmosphere chamber 12. In order to maintain the inert nitrogen atmosphere, the gaseous nitrogen source 38 pumps gaseous nitrogen into the individual chamber 14 via the line 40, the induction heating station 26 via the line 42, the spray coating station 28 via the line 44, the nitrogen cooling station 30 via the line 46, and the peening station 32 via the line 48. In certain exemplary embodiments, each of the chambers 14, 16, 18, 20 and 22 is individually pressurized, and the gaseous nitrogen passes between the chambers based on the pressure differentials in each chamber. In alternative exemplary embodiments, an inert argon atmosphere is provided in the inert atmosphere chamber 12, and thus the gaseous nitrogen source 38 is omitted in favor of an argon source.

The method 80 further includes a step 94, at which the rebar piece 62 is cleaned. In an exemplary embodiment, the step 94 does not take place inside the inert atmosphere provided by the inert atmosphere chamber 12. In an exemplary embodiment, step 94 is carried about by passing the rebar piece 62 through the final abrasive blasting station 36, in which the rebar piece 62 is cleaned in order to remove any remaining contaminants on the surface thereof. In certain exemplary embodiments, the rebar piece 62 is cleaned using a grit or shot blaster at the final abrasive blasting station 36. In other embodiments, the rebar piece 62 is cleaned via shot peening at the final abrasive blasting station 36.

In several exemplary embodiments, during the execution of the method 80, rough surface(s) are not formed on the rebar piece 62, eliminating, or at least reducing, any pinhole bleeds of corrosion resulting from carbon deposits. In an exemplary embodiment, as a result of the execution of the method 80, no post rolling process is necessary. In an exemplary embodiment, as a result of the execution of the method 80, the rebar piece 62 has excellent bending and corrosion resistance properties.

Figure 7:
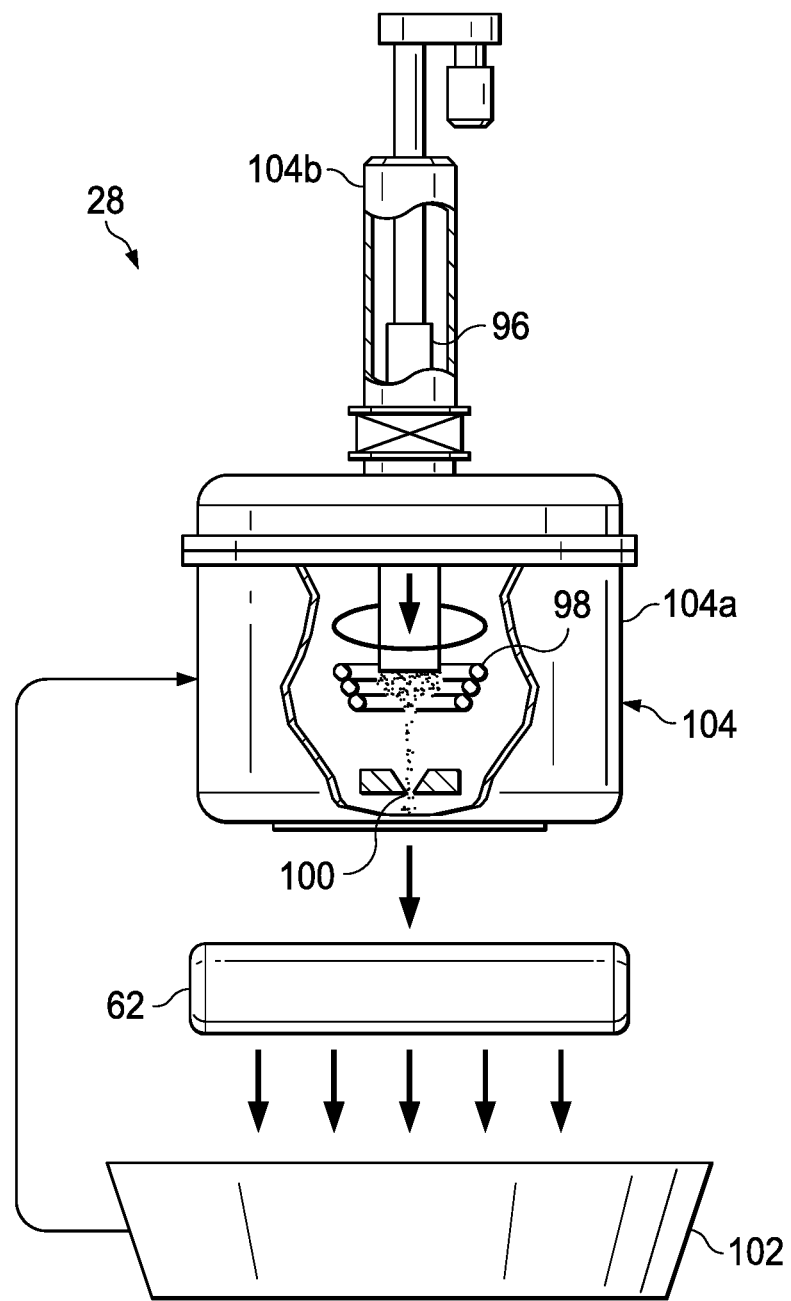
FIG. 7 is a diagrammatic illustration of the spray coating station of the system of FIG. 1, according to another exemplary embodiment.

In an exemplary embodiment, as illustrated in FIG. 7 with continuing reference to FIGS. 1, 2, 3, 4, 5 and 6, instead of the components illustrated in FIGS. 3 and 4, the spray coating station 28 alternatively includes a stainless steel rod 96, which is adapted to be lowered into an annular induction coil 98. A gas atomization nozzle 100 is positioned below the annular induction coil 98. A collection receptacle or container 102 is positioned below the gas atomization nozzle 100. The spray coating station 28 of FIG. 7 further includes an enclosure 104 having a housing 104a and a tubular member 104b extending upward therefrom. The gas atomization nozzle 100 and the annular induction coil 98 are disposed within the housing 104a. The container 102 is positioned proximate the housing 104a, and is operably coupled to the housing 104a so that material in powder form (metal powder) may be moved from the container 102 and into the housing 104a, under conditions to be described below. In an exemplary embodiment, one or more conveying systems are used to operably couple the container 102 to the housing 104a. In an exemplary embodiment, one or more conveyors, and/or one or more pumps, such as one or more vacuum pumps or air pumps, are used to operably couple the container 102 to the housing 104a.

In several exemplary embodiments, the spray coating station 28 may be characterized as, or may include in whole or in part, an electrode induction melting gas atomization (EIGA) system or component(s) thereof.

In several exemplary embodiments, instead of the spray coating station of FIGS. 3 and 4, the method 80 may be executed using the spray coating station 28 of FIG. 7. When the method 80 is executed using the spray coating station 28 of FIG. 7, the steps 82, 84, 88, 90, 92 and 94 of the method 80 are substantially identical to the respective steps when the method 80 is executed using the spray coating station 28 of FIGS. 3 and 4. However, the execution of the step 86 using the spray coating station 28 of FIG. 7 is different from the execution of the step 86 using the spray coating station 28 of FIGS. 3 and 4.

To execute the step 86 using the spray coating station 28 of FIG. 7, in an exemplary embodiment, the rebar piece 62 is sprayed with atomized stainless steel at the step 86a, the stainless steel overspray is collected at the step 86b, and the stainless steel overspray is recycled back into the spray coating station 28 at step 86c.

In an exemplary embodiment, to execute the step 86a using the spray coating station 28 of FIG. 7, at least a portion of the stainless steel rod 96 is initially disposed in the tubular member 104b. The stainless steel rod 96 is slowly lowered within the housing 104a and into the annular induction coil 98. As the rod of stainless steel 96 passes through the annular induction coil 98, it is melted. The melt droplets from the rod of stainless steel 96 fall into the gas atomization nozzle 100 and are atomized with an inert gas, thereby atomizing the stainless steel. In certain exemplary embodiments, the inert gas is nitrogen. In other exemplary embodiments, the inert gas is argon. The atomized stainless steel, in the form of atomized melt particles, are sprayed out of the housing 104a and onto the rebar piece 62, which is positioned between the housing 104a and the container 102. In certain exemplary embodiments, the atomized stainless steel rapidly solidifies to form a stainless steel coating on the rebar piece 62.

In an exemplary embodiment, to execute the step 86b using the spray coating station 28 of FIG. 7, the stainless steel overspray is collected within the container 102, which collects any overspray melt droplets that do not contact the rebar piece 62.

In an exemplary embodiment, to execute the step 86c using the spray coating station 28 of FIG. 7, the stainless steel overspray is conveyed from the container 102 and back into the housing 104a. The stainless steel overspray may be re-melted within the housing 104a, atomized, and sprayed out of the housing 104a and deposited on the rebar piece 62, in accordance with the foregoing. In an exemplary embodiment, the stainless steel overspray is in the form of metal powder, and the metal powder is conveyed from the container 102 and back into the housing 104a. In an exemplary embodiment, the stainless steel overspray is in the form of metal powder, and the metal powder is conveyed from the container 102 and back into the housing 104a using one or more pumps, such as one or more vacuum pumps, or one or more air pumps. In an exemplary embodiment, when executing the method 80 using the spray coating station 28 of FIG. 7, the step 86c may be omitted. In an exemplary embodiment, when executing the method 80 using the spray coating station 28 of FIG. 7, the step 86c may be omitted, and the collected stainless steel overspray may be sold on the market.

In an exemplary embodiment, the annular induction coil 98 may be omitted from the spray coating station 28 of FIG. 7; instead, the spray coating station 28 of FIG. 7 may be characterized as, or may include in whole or in part, a plasma melting induction guiding gas atomization (PIGA) system or component(s) thereof.

In several exemplary embodiments, during the execution of the method 80 using the spray coating station 28 of either FIG. 7 or FIGS. 3 and 4, rough surface(s) are not formed on the rebar piece 62, eliminating, or at least reducing, any pinhole bleeds of corrosion resulting from carbon deposits. In several exemplary embodiments, as a result of the execution of the method 80 using the spray coating station 28 of either FIG. 7 or FIGS. 3 and 4, no post rolling process is necessary, and the rebar piece 62 has excellent bending and corrosion resistance properties.

In several exemplary embodiments, the rebar piece 62 may be passed from through the chambers 14-22 (and the stations 24-34) using one or more conveyors, track systems, and/or any combination thereof.

In several exemplary embodiments, temperature measurement units, which are substantially identical to the temperature measurement unit 64, may be distributed throughout the system 10 to monitor the surface temperature of the rebar piece 62 throughout the execution of the method 80. For example, in certain exemplary embodiments, such temperature measurement units may be disposed within, or between, the stations 26 and 28, the stations 28 and 30, the stations 30 and 32, the stations 32 and 34, and/or the stations 34 and 36. In certain exemplary embodiments, the surface temperature of the rebar piece 62 is measured immediately before the rebar piece 62 exits the inert atmosphere chamber 12.

In several exemplary embodiments, instead of, or in addition to, the carbon steel rebar piece 62, the system 10, and/or the method 80, may be used to clad or coat with stainless steel other types of carbon steel pieces such as, for example, dowel bars and/or rods.

Figure 8:
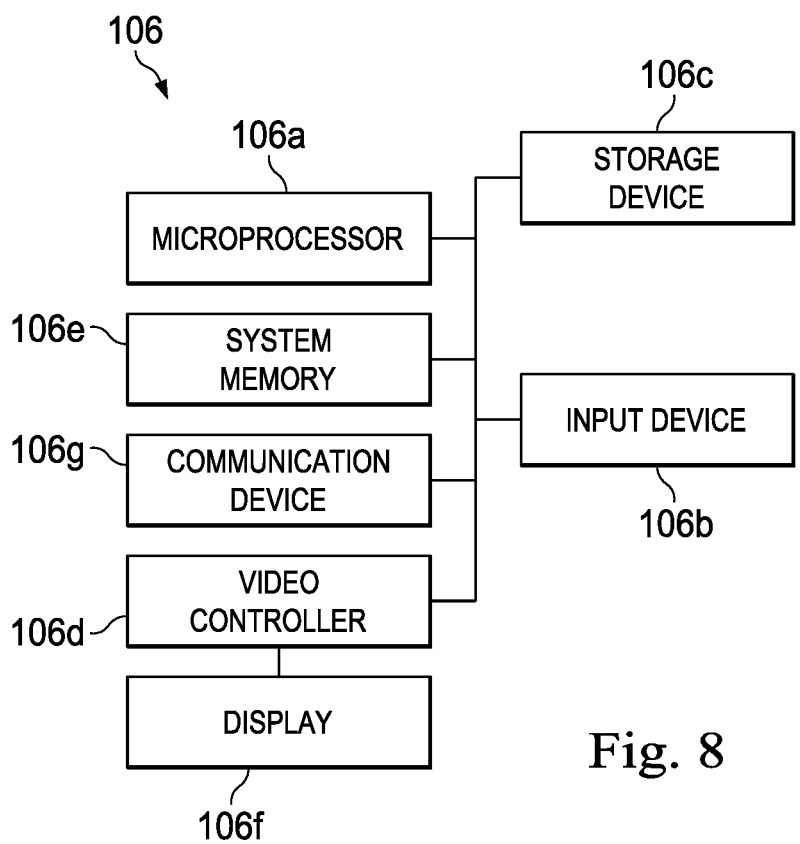
FIG. 8 is a diagrammatic illustration of a node for implementing one or more exemplary embodiments of the present disclosure, according to an exemplary embodiment.

In an exemplary embodiment, as illustrated in FIG. 8 with continuing reference to FIGS. 1, 2, 3, 4, 5, 6 and 7, an illustrative node 106 for implementing one or more embodiments of one or more of the above-described elements, methods and/or steps, and/or any combination thereof, is depicted. The node 106 includes a microprocessor 106a, an input device 106b, a storage device 106c, a video controller 106d, a system memory 106e, a display 106f, and a communication device 106g all interconnected by one or more buses 106h. In several exemplary embodiments, the storage device 106c may include a floppy drive, hard drive, CD-ROM, optical drive, any other form of storage device and/or any combination thereof. In several exemplary embodiments, the storage device 106c may include, and/or be capable of receiving, a floppy disk, CD-ROM, DVD-ROM, or any other form of computer-readable medium that may contain executable instructions. In several exemplary embodiments, the communication device 106g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the system 10, such as one or more of the feedback system 66, the temperature measurement unit 64, one or more of the stations 24, 26, 28, 30, 32, 34 and 36, or components thereof, include at least the node 106 and/or components thereof, and/or one or more nodes that are substantially similar to the node 106 and/or components thereof. In several exemplary embodiments, one or more of the above-described components of the node 106 and/or the system 10 include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out in whole or in part, execute in whole or in part, implement in whole or in part, or control in whole or in part, the above-described operation of each of the above-described exemplary embodiments of the system 10, the above-described execution of each of the above-described exemplary embodiments of the method 80, and/or any combination thereof. In several exemplary embodiments, such one or more processors may include one or more of the microprocessor 106*a*, any processor(s) that are part of the components of the system 10, and/or any combination thereof, and such a computer readable medium may be distributed among one or more components of the system 10. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method of cladding a carbon steel piece with stainless steel has been described that includes conducting a first cleaning of the carbon steel piece using abrasive blasting; after conducting the first cleaning of the carbon steel piece using abrasive blasting, heating the carbon steel piece using induction heating; after heating the carbon steel piece using induction heating, coating the carbon steel piece with the stainless steel, wherein coating the carbon steel piece with the stainless steel includes melting the stainless steel; atomizing the melted stainless steel; and spraying the atomized stainless steel so that at least a portion of the atomized stainless steel is deposited on the carbon steel piece to thereby coat the carbon steel piece with the stainless steel; after coating the carbon steel piece with the stainless steel, conducting a first cooling of the carbon steel piece; and after conducting the first cooling of the carbon steel piece, strengthening the carbon steel piece. In an exemplary embodiment, the method includes, after strengthening the carbon steel piece, conducting a second cooling of the carbon steel piece; and after conducting the second cooling of the carbon steel piece, conducting a second cleaning of the carbon steel piece using abrasive blasting. In an exemplary embodiment, the steps of conducting the first cleaning, heating, coating, conducting the first cooling, strengthening, and conducting the second cooling, are executed within an inert atmosphere. In an exemplary embodiment, conducting the first cleaning of the carbon steel piece using abrasive blasting includes cleaning the carbon steel piece using a grit or shot blaster. In an exemplary embodiment, heating the carbon steel piece using induction heating includes supplying electrical power to an induction coil; and passing the carbon steel piece through the induction coil. In an exemplary embodiment, melting the stainless steel includes melting two or more stainless steel wires using an electric arc; and wherein atomizing the melted stainless steel includes passing through an atomizing passage an inert gas so that the inert gas contacts the melted two or more stainless steel wires. In an exemplary embodiment, melting the stainless steel and atomizing the melted stainless steel are part of either an electrode induction melting gas atomization (EIGA) process or a plasma melting induction guiding gas atomization (PIGA) process. In an exemplary embodiment, liquid nitrogen is used to conduct each of the first and second coolings of the carbon steel piece; and wherein strengthening the carbon steel piece includes strengthening the carbon steel piece by impacting the carbon steel piece with shot in a cold working process. In an exemplary embodiment, heating the carbon steel piece includes heating the carbon steel piece to a first surface temperature of between about 1800 and about 2500 degrees Fahrenheit; wherein conducting the first cooling of the carbon steel piece includes cooling the carbon steel piece to a second surface temperature of between about 1100 and about 1400 degrees Fahrenheit; and wherein conducting the second cooling of the carbon steel piece includes cooling the carbon steel piece to a third surface temperature below about 400 degrees Fahrenheit. In an exemplary embodiment, the carbon steel piece is a carbon steel rebar piece; and wherein the atomized stainless steel is deposited on the carbon steel piece in a semi-molten condition. In an exemplary embodiment, the method includes collecting stainless steel overspray; and recycling the collected stainless steel overspray.

A method of cladding a carbon steel piece with stainless steel has been described that includes conducting a first cleaning of the carbon steel piece; heating the carbon steel piece; coating the carbon steel piece with the stainless steel, wherein coating the carbon steel piece with the stainless steel includes melting the stainless steel; atomizing the melted stainless steel; and spraying the atomized stainless steel so that at least a portion of the atomized stainless steel is deposited on the carbon steel piece to thereby coat the carbon steel piece with the stainless steel; and strengthening the carbon steel piece. In an exemplary embodiment, the method includes, after coating the carbon steel piece with the stainless steel, conducting a first cooling of the carbon steel piece; after strengthening the carbon steel piece, conducting a second cooling of the carbon steel piece; and after conducting the second cooling of the carbon steel piece, conducting a second cleaning of the carbon steel piece. In an exemplary embodiment, the steps of conducting the first cleaning, heating, coating, conducting the first cooling, strengthening, and conducting the second cooling, are executed within an inert atmosphere. In an exemplary embodiment, heating the carbon steel piece includes heating the carbon steel piece to a first surface temperature of between about 1800 and about 2500 degrees Fahrenheit; wherein conducting the first cooling of the carbon steel piece includes cooling the carbon steel piece to a second surface temperature of between about 1100 and about 1400 degrees Fahrenheit; and wherein conducting the second cooling of the carbon steel piece includes cooling the carbon steel piece to a third surface temperature below about 400 degrees Fahrenheit. In an exemplary embodiment, melting the stainless steel includes melting two or more stainless steel wires using an electric arc; and wherein atomizing the melted stainless includes passing through an atomizing passage an inert gas so that the inert gas contacts the melted two or more stainless steel wires. In an exemplary embodiment, melting the stainless steel and atomizing the melted stainless steel are part of either an electrode induction melting gas atomization (EIGA) process or a plasma melting induction guiding gas atomization (PIGA) process. In an exemplary embodiment, the method includes collecting stainless steel overspray; and recycling the collected stainless steel overspray.

A system for cladding a carbon steel piece with stainless steel has been described that includes an inert atmosphere chamber; a first abrasive blasting station to clean the carbon steel piece; an induction heating station to heat the carbon steel piece; a spray coating station to coat the carbon steel piece with the stainless steel; and a peening station to strengthen the carbon steel piece; wherein each of the first abrasive blasting station, the induction heating station, the spray coating station, and the peening station, are disposed within the inert atmosphere chamber. In an exemplary embodiment, the system includes a first cooling station to cool the carbon steel piece after the carbon steel piece has been coated with the stainless steel; and a second cooling station to cool the carbon steel piece after the carbon steel piece has been strengthened; wherein each of the first and second cooling stations is disposed within the inert atmosphere chamber. In an exemplary embodiment, the inert atmosphere chamber includes first, second, third, fourth, and fifth chambers therein; wherein each of the first abrasive blasting station and the induction heating station is disposed within the first chamber; and wherein the spray coating station, the first cooling station, the peening station, and the second cooling station are disposed within the second, third, fourth, and fifth chambers, respectively. In an exemplary embodiment, the system includes a second abrasive blasting station to clean the carbon steel piece after the carbon steel piece has been strengthened and cooled; wherein the second abrasive blasting station is disposed outside of the inert atmosphere chamber. In an exemplary embodiment, the system includes a gaseous nitrogen source in fluid communication with each of the first chamber, the induction heating station, the spray coating station, the first cooling station, and the peening station; and a liquid nitrogen source in fluid communication with each of the first and second cooling stations. In an exemplary embodiment, the spray coating station includes a housing in which the stainless steel is melted; and a container positioned proximate the housing; wherein stainless steel overspray is adapted to be conveyed from the container to the housing.

An apparatus has been described that includes a non-transitory computer readable medium; and a plurality of instructions stored on the non-transitory computer readable medium and executable by one or more processors, the plurality of instructions including instructions that cause the one or more processors to conduct a first cleaning of the carbon steel piece using abrasive blasting; instructions that cause the one or more processors to, after conducting the first cleaning of the carbon steel piece using abrasive blasting, heat the carbon steel piece using induction heating; instructions that cause the one or more processors to, after heating the carbon steel piece using induction heating, coat the carbon steel piece with stainless steel, wherein the instructions that cause the one or more processors to coat the carbon steel piece with the stainless steel include instructions that cause the one or more processors to melt the stainless steel; instructions that cause the one or more processors to atomize the melted stainless steel; and instructions that cause the one or more processors to spray the atomized stainless steel so that at least a portion of the atomized stainless steel is deposited on the carbon steel piece to thereby coat the carbon steel piece with the stainless steel; instructions that cause the one or more processors to, after coating the carbon steel piece with the stainless steel, conduct a first cooling of the carbon steel piece; and instructions that cause the one or more processors to, after conducting the first cooling of the carbon steel piece, strengthen the carbon steel piece. In an exemplary embodiment, the plurality of instructions further includes instructions that cause the one or more processors to, after strengthening the carbon steel piece, conduct a second cooling of the carbon steel piece; and instructions that cause the one or more processors to, after conducting the second cooling of the carbon steel piece, conduct a second cleaning of the carbon steel piece using abrasive blasting. In an exemplary embodiment, the conducting the first cleaning, the heating, the coating, the conducting the first cooling, the strengthening, and the conducting the second cooling, are executed within an inert atmosphere. In an exemplary embodiment, the instructions that cause the one or more processors to conduct the first cleaning of the carbon steel piece using abrasive blasting include instructions that cause the one or more processors to clean the carbon steel piece using a grit or shot blaster. In an exemplary embodiment, the instructions that cause the one or more processors to heat the carbon steel piece using induction heating include instructions that cause the one or more processors to supply electrical power to an induction coil; and instructions that cause the one or more processors to pass the carbon steel piece through the induction coil. In an exemplary embodiment, the instructions that cause the one or more processors to melt the stainless steel include instructions that cause the one or more processors to melt two or more stainless steel wires using an electric arc; and wherein the instructions that cause the one or more processors to atomize the melted stainless steel include instructions that cause the one or more processors to pass through an atomizing passage an inert gas so that the inert gas contacts the melted two or more stainless steel wires. In an exemplary embodiment, the instructions that cause the one or more processors to melt the stainless steel and the instructions that cause the one or more processors to atomize the melted stainless steel are part of either instructions that cause the one or more processors to execute an electrode induction melting gas atomization (EIGA) process or instructions that cause the one or more processors to execute a plasma melting induction guiding gas atomization (PIGA) process. In an exemplary embodiment, liquid nitrogen is used to conduct each of the first and second coolings of the carbon steel piece; and wherein the instructions that cause the one or more processors to strengthen the carbon steel piece include instructions that cause the one or more processors to strengthen the carbon steel piece by impacting the carbon steel piece with shot in a cold working process. In an exemplary embodiment, the instructions that cause the one or more processors to heat the carbon steel piece include instructions that cause the one or more processors to heat the carbon steel piece to a first surface temperature of between about 1800 and about 2500 degrees Fahrenheit; wherein the instructions that cause the one or more processors to conduct the first cooling of the carbon steel piece include instructions that cause the one or more processors to cool the carbon steel piece to a second surface temperature of between about 1100 and about 1400 degrees Fahrenheit; and wherein the instructions that cause the one or more processors to conduct the second cooling of the carbon steel piece include instructions that cause the one or more processors to cool the carbon steel piece to a third surface temperature below about 400 degrees Fahrenheit. In an exemplary embodiment, the carbon steel piece is a carbon steel rebar piece; and wherein the atomized stainless steel is deposited on the carbon steel piece in a semi-molten condition. In an exemplary embodiment, the plurality of instructions further includes instructions that cause the one or more processors to recycle collected stainless steel overspray.

An apparatus has been described that includes a non-transitory computer readable medium; and a plurality of instructions stored on the non-transitory computer readable medium and executable by one or more processors, the plurality of instructions including instructions that cause the one or more processors to heat the carbon steel piece; instructions that cause the one or more processors to coat the carbon steel piece with stainless steel, wherein the instructions that cause the one or more processors to coat the carbon steel piece with the stainless steel include instructions that cause the one or more processors to melt the stainless steel; instructions that cause the one or more processors to atomize the melted stainless steel; and instructions that cause the one or more processors to spray the atomized stainless steel so that at least a portion of the atomized stainless steel is deposited on the carbon steel piece to thereby coat the carbon steel piece with the stainless steel; and instructions that cause the one or more processors to strengthen the carbon steel piece. In an exemplary embodiment, the plurality of instructions further includes instructions that cause the one or more processors to, after coating the carbon steel piece with the stainless steel, conduct a first cooling of the carbon steel piece; instructions that cause the one or more processors to, after strengthening the carbon steel piece, conduct a second cooling of the carbon steel piece; and instructions that cause the one or more processors to, after conducting the second cooling of the carbon steel piece, conduct a second cleaning of the carbon steel piece. In an exemplary embodiment, the conducting the first cleaning, the heating, the coating, the conducting the first cooling, the strengthening, and the conducting the second cooling, are executed within an inert atmosphere. In an exemplary embodiment, the instructions that cause the one or more processors to heat the carbon steel piece include instructions that cause the one or more processors to heat the carbon steel piece to a first surface temperature of between about 1800 and about 2500 degrees Fahrenheit; wherein the instructions that cause the one or more processors to conduct the first cooling of the carbon steel piece include instructions that cause the one or more processors to cool the carbon steel piece to a second surface temperature of between about 1100 and about 1400 degrees Fahrenheit; and wherein the instructions that cause the one or more processors to conduct the second cooling of the carbon steel piece include instructions that cause the one or more processors to cool the carbon steel piece to a third surface temperature below about 400 degrees Fahrenheit. In an exemplary embodiment, the instructions that cause the one or more processors to melt the stainless steel include instructions that cause the one or more processors to melt two or more stainless steel wires using an electric arc; and wherein the instructions that cause the one or more processors to atomize the melted stainless include instructions that cause the one or more processors to pass through an atomizing passage an inert gas so that the inert gas contacts the melted two or more stainless steel wires. In an exemplary embodiment, the instructions that cause the one or more processors to melt the stainless steel and the instructions that cause the one or more processors to atomize the melted stainless steel are part of either instructions that cause the one or more processors to execute an electrode induction melting gas atomization (EIGA) process or instructions that cause the one or more processors to execute a plasma melting induction guiding gas atomization (PIGA) process. In an exemplary embodiment, the plurality of instructions further includes instructions that cause the one or more processors to recycle collected stainless steel overspray.

It is understood that variations may be made in the foregoing without departing from the scope of the disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A product, comprising:
   a carbon steel piece; and
   an atomized stainless steel spray coating that clads the carbon steel piece;
   wherein the thickness of the atomized stainless steel spray coating is equal to or greater than 0.007 inches;
   wherein the carbon steel piece is a carbon steel rebar piece or dowel bar;
   wherein the atomized stainless steel spray coating, which clads the carbon steel rebar piece or dowel bar, defines an external surface of the product;
   wherein the external surface of the product, which is defined by the atomized stainless steel spray coating, has a surface finish;
   and
   wherein the surface finish of the external surface of the product is a shot-peen surface finish.

2. The product of claim 1, wherein the thickness of the atomized stainless steel spray coating ranges from 0.007 inches to 0.010 inches.

3. The product of claim 1, wherein the atomized stainless steel spray coating is evenly distributed on the carbon steel piece.

4. The product of claim 1, wherein the atomized stainless steel spray coating is impermeable.

5. The product of claim 1, wherein the atomized stainless steel spray coating is void of any pinhole bleeds of corrosion.

6. The product of claim 1, wherein the thickness of the atomized stainless steel spray coating is greater than 0.010 inches.

7. The product of claim 1, wherein the external surface of the product, which is defined by the atomized stainless steel spray coating, is free from contaminants.

8. The product of claim 1, wherein the carbon steel rebar piece or dowel bar comprises:
   opposing first and second end portions; and
   a middle portion extending longitudinally between the opposing first and second end portions.

* * * * *